(12) United States Patent
Meriac et al.

(10) Patent No.: US 11,210,393 B2
(45) Date of Patent: Dec. 28, 2021

(54) CONTEXT DATA CONTROL

(71) Applicant: Arm IP Limited, Cambridge (GB)

(72) Inventors: Milosch Meriac, Cambridge (GB); Alessandro Angelino, London (GB)

(73) Assignee: ARM IP LIMITED, Cambridge (GB)

( * ) Notice: Subject to any disclaimer, the term of this patent is extended or adjusted under 35 U.S.C. 154(b) by 244 days.

(21) Appl. No.: 16/303,291

(22) PCT Filed: Apr. 6, 2017

(86) PCT No.: PCT/GB2017/050965
§ 371 (c)(1),
(2) Date: Nov. 20, 2018

(87) PCT Pub. No.: WO2017/203199
PCT Pub. Date: Nov. 30, 2017

(65) Prior Publication Data
US 2019/0213329 A1    Jul. 11, 2019

(30) Foreign Application Priority Data
May 27, 2016  (GB) ...................... 1609417

(51) Int. Cl.
*G06F 21/55* (2013.01)
*G06F 9/46* (2006.01)
(Continued)

(52) U.S. Cl.
CPC .............. *G06F 21/556* (2013.01); *G06F 1/24* (2013.01); *G06F 9/455* (2013.01); *G06F 9/461* (2013.01); *G06F 2221/031* (2013.01)

(58) Field of Classification Search
CPC ..................................................... G06F 21/556
See application file for complete search history.

(56) References Cited

U.S. PATENT DOCUMENTS 4,797,853 A * 1/1989 Savage ................... G06F 13/32
710/22
5,146,603 A * 9/1992 Frost ................... G06F 12/0831
711/143
(Continued)

OTHER PUBLICATIONS

International Search Report and Written Opinion of the ISA for PCT/GB2017/050965, dated Jul. 17, 2017, 16 pages.
(Continued)

*Primary Examiner* — Simon P Kanaan
(74) *Attorney, Agent, or Firm* — Nixon & Vanderhye, PC

(57) ABSTRACT

A technology for mutually isolating accessors of a shared electronic device from leakage of context data after a context switch comprises: on making the shared electronic device available to the plurality of accessors, establishing a portion of storage as an indicator location for the shared electronic device; when a first accessor requests use of the shared electronic device, writing at least one device-reset-required indicator to the indicator location; on switching context to a new context, after context save, when a second accessor requests use of the shared electronic device, resetting context data of the shared electronic device to a known state and reconciling the first device-reset-required indicator and a second device-reset-required indicator for the new context.

12 Claims, 2 Drawing Sheets

Figure 1:
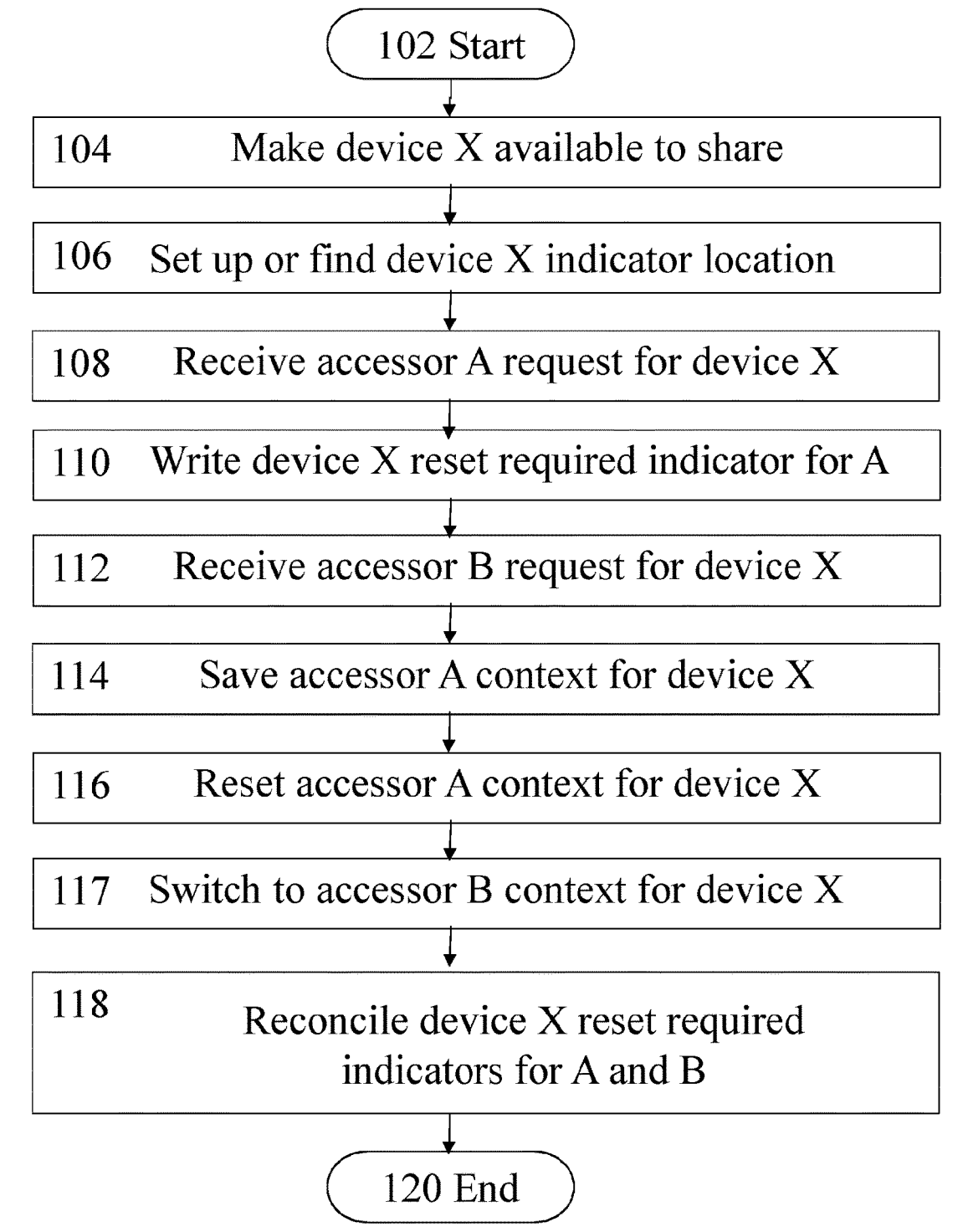

(51) Int. Cl.
*G06F 1/24* (2006.01)
*G06F 9/455* (2018.01)

(56) References Cited

U.S. PATENT DOCUMENTS

| | | | | |
|---|---|---|---|---|
| 5,165,028 A | * | 11/1992 | Zulian | G06F 12/1054 711/207 |
| 5,555,423 A | * | 9/1996 | Grochowski | G06F 9/45533 712/229 |
| 7,003,423 B1 | * | 2/2006 | Kabani | G06F 1/12 702/120 |
| 7,168,065 B1 | * | 1/2007 | Naccache | G06F 11/28 712/229 |
| 2003/0212724 A1 | * | 11/2003 | Ovshinsky | G11C 11/56 708/490 |
| 2006/0061795 A1 | * | 3/2006 | Walmsley | G06F 21/73 358/1.14 |
| 2007/0136724 A1 | * | 6/2007 | Sharma | G06F 9/45533 718/1 |
| 2012/0023311 A1 | * | 1/2012 | Yamamoto | G06F 9/3851 712/205 |
| 2013/0205403 A1 | | 8/2013 | Grocutt et al. | |
| 2013/0227704 A1 | | 8/2013 | Boivie et al. | |
| 2014/0137184 A1 | * | 5/2014 | Russello | H04L 63/20 726/1 |
| 2014/0230077 A1 | | 8/2014 | Muff et al. | |
| 2015/0332043 A1 | * | 11/2015 | Russello | G06F 21/52 726/23 |
| 2017/0040051 A1 | * | 2/2017 | Edirisooriya | G06F 1/28 |
| 2019/0339985 A1 | * | 11/2019 | Cook | G06F 11/1441 |

OTHER PUBLICATIONS

Combined Search and Examination Report for GB1609417.9, dated Oct. 31, 2016, 6 pages.
Examination Report for GB1609417.9, dated Oct. 16, 2018, 5 pages.
China National Intellectual Property Administration Notification of First Office Action for Application No. 201780031544,6 dated Jun. 8, 2021 with English translation, 51 pages.

\* cited by examiner

CONTEXT DATA CONTROL

This application is the U.S. national phase of International Application No. PCT/GB2017/050965 filed 6 Apr. 2017 which designated the U.S. and claims priority to GB Patent Application No. 1609417.9 filed 27 May 2016, the entire contents of each of which are hereby incorporated by reference.

The present invention relates to a technology for efficiently mutually isolating a plurality of accessors of a shared electronic device from leakage of context data after a context switch.

In many modern electronic systems, resources such as peripheral devices may be shared among a number of accessors, such as microprocessors. This sharing may further involve the use of virtualization techniques, whereby each accessor is presented with an individual image of the resource in such a way that the resource appears to be wholly dedicated to that accessor.

In conventional systems, when a different accessor gains control of the resource, the context data relating to the previous accessor may remain in electronic storage, such as hardware registers or other storage locations, until it is at some future time overwritten.

In a first approach, the described technology provides a machine-implemented method of mutually isolating a plurality of accessors of a shared electronic device from leakage of context data after a context switch, comprising: on making the shared electronic device available to the plurality of accessors, performing at least one of: establishing a portion of storage as an indicator location for the shared electronic device and locating an address of a predefined indicator location; when a first accessor requests use of the shared electronic device, writing at least one device-reset-required indicator to the indicator location; on switching context to a new context, after context save, when a second accessor requests use of the shared electronic device, resetting context data of the shared electronic device to a known state and reconciling the first device-reset-required indicator and a second device-reset-required indicator for the new context.

In a second approach, there is provided an electronic control device operable to mutually isolate a plurality of accessors of a shared electronic device from leakage of context data after a context switch, comprising: an indicator control component operable to, when the shared electronic device is made available to the plurality of accessors, cause a storage component to perform at least one of: establishing a portion of storage as an indicator location for the shared electronic device and locating an address of a predefined indicator location; the indicator control component further operable to, when a first accessor requests use of the shared electronic device, write at least one device-reset-required indicator to the indicator location; a reset control component responsive to the device-reset-required indicator and operable to, on switching context to a new context, after context save, when a second accessor requests use of the shared electronic device, reset context data of the shared electronic device to a known state; and a reconciling component operable to reconcile the first device-reset-required indicator and a second device-reset-required indicator for the new context.

Figure 2:
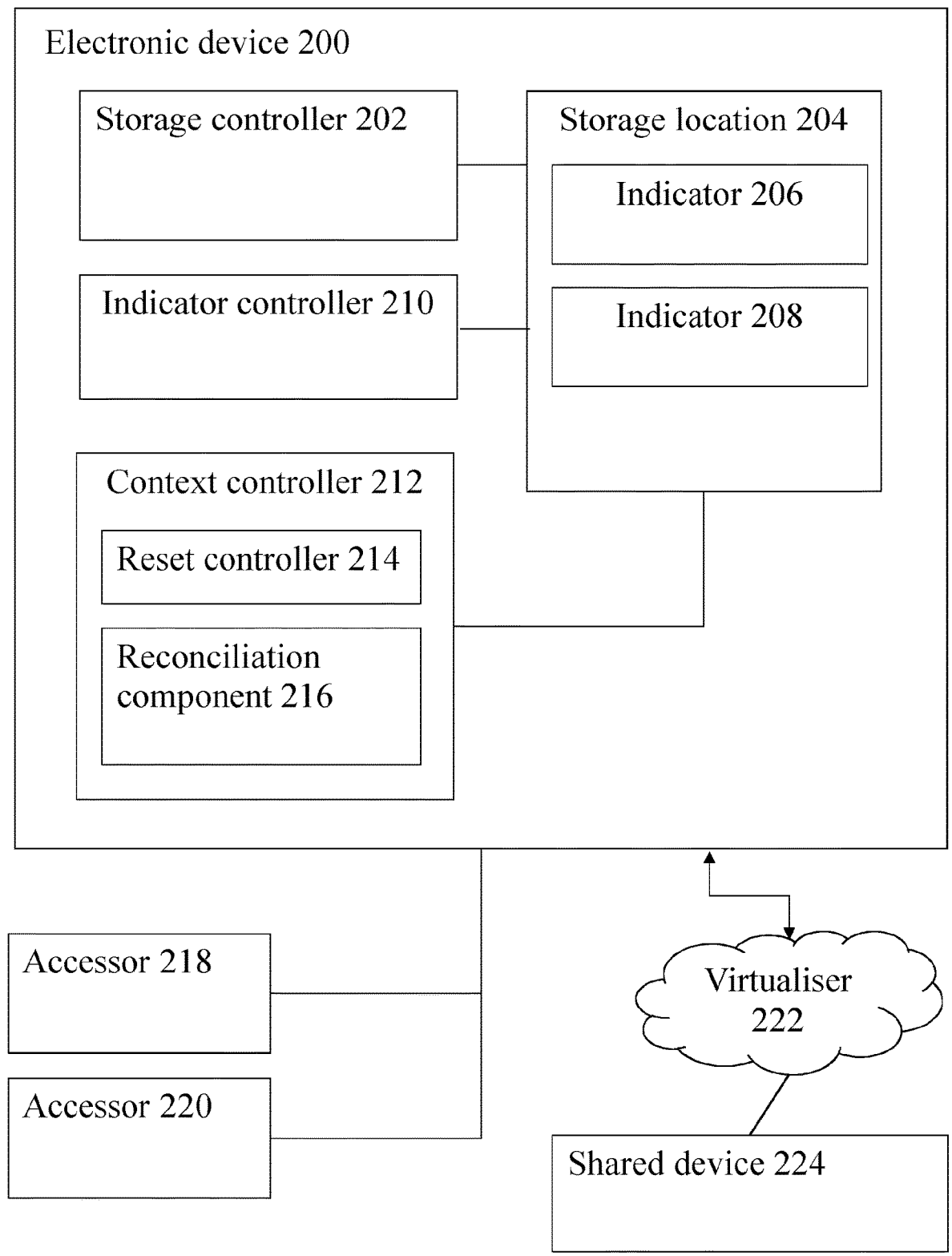

Implementations of the disclosed technology will now be described, by way of example only, with reference to the accompanying drawings, in which:

FIG. 1 shows an example of a method of operation according to the presently described technology; and FIG. 2 shows an example of an electronic control device operable according to the presently described technology.

As described above, in conventional data processing and communication systems, when a different accessor gains control of a shared device, the context data relating to the previous accessor may remain in electronic storage, such as hardware registers or other storage locations until it is at some future time overwritten, and this may be undesirable for several reasons—for example, because the stored context may contain sensitive data, such as a password or a cryptographic seed, or it may contain code or data which does not have the same level of trustworthiness as is needed by the second or further accessor. Thus, access to context data relating to peripherals may be security or safety critical. The availability of "leftover" context data can be exploited in many ways, such as by denial-of-service, over-privileging, etc. For example, a hacker could disrupt a system by using such context data to prevent execution of a module responsible for detecting malware or to prevent a safety mechanism from activating—such as a safety mechanism for slowing a system when the system is going too fast. In safety-critical real-time systems, the standard safety models do not consider the possibility of such an active attack, and thus any leftover context data may offer an additional attack surface for the malicious to exploit.

Apart from such security and safety applications, the described peripheral-reset method or device allows clean reinitialization of complex peripherals without rebooting the rest of the system—for example after updating the wireless stack firmware module or after the stack has failed.

Turning now to FIG. 1, there is shown an example of a method 100 of operating a device that is made available to a plurality of accessors and operable to mutually isolate a plurality of accessors of a shared electronic device from leakage of context data after a context switch. The method 100 starts at START step 102, and at step 104, the device is made available for sharing by the plurality of accessors. The device may be a hardware device, or it may be a software resource. Examples include hardware peripherals, such as storage devices, or may include software components, such as cryptography components implemented programmatically. The accessors may include data processing devices, such as microcontrollers or computer CPUs.

At step 106, either an indicator location is set up in storage, or a predefined indicator location is located and its address stored for use. The indicator location may comprise a flag register, a bitmap, a run-length encoding of a portion of storage, a scatter-gather table, or a mixed indicator data and executable code store. In the latter case, the executable code may be operable to clear context data by, for example, overwriting it with binary zeroes or with a pseudo-random pattern of bits, so that the previous data is no longer recoverable.

At step 108, accessor A requests access to the shared device, and at step 110, a device-reset-required indicator for accessor A is written to the indicator location. The device-reset-required indicator for accessor A indicates the context data storage portions of the shared device which are required by the accessor A, and that are to be reset when accessor A is no longer accessing the shared device. For example, when the indicator location comprises a bitmap, the device-reset-required indicator sets each bit of the bitmap that corresponds to a context data storage portions of the shared device which needs to be reset, and sets to zero each bit of the bitmap that corresponds to a context data storage portions of the shared device which does not need to be reset.

When it is not known in advance which context data storage portions of the shared device are required by the accessor A, then the device-reset-required indicator for accessor A may be set as each context data storage portion of the shared device is used by the accessor A. Consequently, the device-reset-required indicator for accessor A, indicates the context data storage portions of the shared device which have been used by the accessor A, and that are to be reset when accessor A is no longer accessing the shared device.

The shared device is then used by accessor A. At step 112, by means of, for example, an interrupt, accessor B requests use of the shared device, the request is honoured so that the device context for the device's use by accessor A is saved at step 114, and at step 116, the accessor A context for the device is reset to a known state. The known state may be, for example, a clean boot state, a prior known state or a known trusted state. The device-reset-required indicator is used so that only context data storage portions of the shared device which have been used accessor A are reset back to their initial setting. At this point, a delay may be needed to allow the device reset to complete. This may be achieved, for example, by polling a status register to determine whether or not the reset has been completed. Typically, the reset may take multiple cycles, or the process might be performed at a lower clock speed than the core clock, and thus a delay (waitstate) may be necessary.

At step 117, the context switch to the appropriate context for accessor B to access the device occurs, a device-reset-required indicator for accessor B is written to the indicator location, and at step 118, the device-reset-required indicators for the accesses to the device by accessor A and accessor B are reconciled. Accessor A requires the shared device to be reset before accessor B initializes the shared device, however, accessor B wants to initialize the shared device as soon as possible. Therefore, the device-reset-required indicator for accessor A is reconciled with the device-reset-required indicator for accessor B in order to determine the context data storage portions of the shared device which are not required to be reset, such that access by accessor B to the context data storage portions of the shared device which are not required to be reset, can be allowed immediately.

Although reconciliation step 118, is describe and illustrated as happening after the reset step 116, the reconciliation step 118 and the reset step 116 may be performed at substantially the same time. In addition, the reconciliation step 118 may be performed before the reset step 116.

The device-reset-required indicator for accessor A indicates the context data storage portions of the shared device which have been accessed by accessor A, and the device-reset-required indicator for accessor B indicates the context data storage portions of the shared device which are required by accessor B. According to one embodiment, reconciliation of the device-reset-required indicators for accessor A and accessor B, comprises a comparison of the device-reset-required indicators to determine the context data storage portions which are common for accessor A and accessor B, and the context data storage portions which are not common for accessor A and accessor B.

In one example where it is known in advance that accessor B will write its first context data at its initialization time, this reconciliation is accomplished by means of an XOR logical operation on the indicator location, so that only those context data storage portions that are not common to accessor A and accessor B are reset, as accessor B has already begun to store its context data in the locations that are common, and thus a duplication of effort is avoided and time is saved. At End step 120, the process completes.

In one refinement of the above method, when the order in which certain known context data elements will be used after reset is understood from previous executions, or when it is urgent that certain context data elements be ready for use before others, the latency of the context switch can be further reduced by sequencing the reset actions accordingly and beginning to execute the new task in parallel with the reset actions, using the context data elements as and when they are reset. According to this embodiment, reconciliation of the device-reset-required indicators for accessor A and accessor B, comprises a determination of the context data elements which are common and a prioritisation of the reset of the common context data elements, in accordance with the order in which the context data elements will be required. Therefore, the context data elements are reset in the order in which they are required to reduce latency. When the new task reaches a point in its execution at which a needed context data element has not yet been reset, the new task may be paused to allow the reset actions to catch up.

When a context switch occurs, which requires the shared device to be restored to a previous context, the context data elements of the shared device are restored. For example, following completion of the task by accessor B, access to the shared device returns to accessor A, such that accessor A may complete its task. Therefore, the context for the shared device's use by accessor A, as saved at step 114, is restored. The context data elements may be reset/restored in the order in which they are required in order to reduce the context switch latency.

In addition, when a context switch occurs, which requires the shared device to be restored to a previous context, the reconciliation of the device-reset-required indicators for accessor A and accessor B allows immediate access to context data elements that are not marked for reset/restoration, reconciling the need to prevent leakage of context data for accessor B, with the need for immediate use and low latency context switching of the shared device by accessor A.

For example, consider the following arrangement:
The shared device is a cryptographic accelerator.
At a context switch all registers are reset and marked as non-restored (one bit per register etc.)
The operation of the cryptographic accelerator can immediately start after the context switch.
After it hits the first non-restored, but used, register in its operation—the hardware engine of the cryptographic accelerator goes to sleep.
As soon as the (software- or hardware-based) restoration hits that register it resumes the operation of the device so that it can continue until it hits the next non-restored, but used, register or terminates execution.
In this arrangement, it is beneficial for the device-hardware design to arrange the registers in an order that reflects early dependencies in device operations. In addition, using performance counters counting the sleep cycles, software can optimize the order of restoration, so minimal sleep cycles occur.

In a further refinement, the restoration software may set a bitmask of registers it intends to restore as the first step when interacting with the device. The non-restored bit is set for only these registers. For all the remaining registers the default reset value applies. The number of registers needing to be restored is reduced as a result.

Turning now to FIG. 2, there is shown an electronic control device 200 operable to mutually isolate a plurality of accessors of a shared electronic device from leakage of context data after a context switch. Device 200 comprises a storage controller of any conventional type and adapted to control storage location 204. Device 200 further comprises an indicator controller 210 in electronic communication with storage location 204 to establish and control indicators 206, 208. Further connected to storage location 204 and thus to indicators 206, 208 is context controller 212, which comprises a reset controller 214 responsive to indicators 206, 208 to cause reset of context data for shared device 224.

The reset controller 214 may contain a polling component to poll a status register to determine whether or not the reset has completed before allowing access to shared device 224. In another implementation, reset controller 214 may have interrupt functionality arranged to trigger an IRQ once restoration is completed.

In a yet further implementation, using the parallel processing of the context data reset/restoration and the new task execution or new operation of the device as described above, reset controller 214 may order the resetting and/or restoration of context data elements according to their expected order of use, and may then permit access using the context data elements as and when they are reset/restored, and may be arranged to pause the new task's execution if a context data element that is needed has not yet been reset/restored.

Shared device 224 may be connected to electronic device 200 via a virtualiser 222 which presents a virtual image of the shared device to accessors 218, 200. Context controller 212 further comprises a reconciliation component 216, operable to reconcile indicators 206, 208 to reduce latency during a context switch. According to one embodiment, the reconciliation component 216 reconciles the indicators 206, 208 to determine which context data elements are required to be reset and/or restored when a context switch occurs. The reconciliation component 216 may also reconcile the indicators 206, 208 to determine the order in which the context data elements are required to be reset and/or restored when a context switch occurs in order to reduce the context switch latency.

The shared electronic device may comprise, for example, a storage device, a cryptography engine, a wired communication device or a wireless communication device, but is not limited to these examples, as any device having a controller that stores context for its activities may benefit from the described technology.

In an implementation, the described technique allows low-latency context switches between multiple users of the same hardware instance without leakage of context data. An example use case is the sharing of one cryptography engine among mutually distrustful and heterogeneous software modules in a traditional microcontroller unit (MCU) system (separated by a hypervisor or similar security measures). With such distrustful and heterogeneous accessors of a shared device, a further important consideration is the differing latency requirements of, for example, a wireless stack's use of the cryptography engine, and other uses of the engine, such as for decryption of a firmware image or the operation of a transport layer security (TLS) connection to a remote server.

This implementation requires a register, or other reserved data storage location, that can act as an indicator that the hardware registers for the selected peripheral should be reset to a known state, such as a clean boot state—many conventional peripherals already contain such means to allow such a clean boot reset (synchronous or asynchronous). Such a register or storage location could be central for all devices in a communicating network or part of each peripheral that supports sharing in hardware.

This implementation of the technology works as follows:
Before switching to a peripheral for a new context, the reset of the peripheral is guaranteed by writing an indicator to the mentioned single register or storage location.
The software in the target security context then only needs to initialize the registers it actually needs. It can assume that peripherals are "clean" as if a power cycle has occurred.

As a result of this implementation, aborting an ongoing operation has very low latency as it would only require the use of the reset register (or other storage element) and the re-initializing of the peripheral from scratch instead of locating and selectively wiping all used registers and scratch memories, switching context and updating the actually used registers.

In a further implementation, faster storage of a peripheral context is enabled as follows:
a bitmap-register or similar storage location is established in which each bit corresponds to all registers that have been updated after the initial peripheral boot. For registers that don't need to be restored the corresponding register bit would be set to zero to allow skipping them when storing or restoring.
The software or circuitry saves the above bitmap and stores or restores only the corresponding registers or other context data locations.

In this implementation, registers (or other storage locations) can be arranged in a way where updating the last register in the peripheral results in starting the device (stopped after reset) to permit usage of direct memory access (DMA), which can skip unused registers when saving and restoring the bitmap and the corresponding registers for higher speed and lower latency.

In implementations of the described technology, the action of making the shared electronic device available may comprise making the device available through a virtualization component. Establishing a portion of storage as an indicator location may comprise creation of a flag register, a bitmap, a run-length encoding of a portion of storage, a scatter-gather table, or a mixed indicator data and executable code store. Establishing a portion of storage as an indicator location may comprise establishing a central location to serve a communicating network of shared electronic devices, or establishing a number of device-level indicator locations. Resetting context data may comprise resetting all context data or resetting selected context data. Resetting context data may comprise resetting to a clean boot state, a prior known state or a known trusted state. In one implementation, the resetting of context data may comprise a direct memory access (DMA) process. In this implementation, stored context data may be returned from a separate data store to the appropriate device storage locations using DMA, and the DMA may be controlled using, for example, a scatter-gather table to collect and make contiguous the context data for the DMA process.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method of mutually isolating a plurality of accessors of a shared electronic device from leakage of context data after a context switch, comprising:
    on making said shared electronic device available to said plurality of accessors, performing at least one of:
        establishing a portion of storage as an indicator location for said shared electronic device and locating an address of a predefined indicator location;
    when a first said accessor requests use of said shared electronic device, writing a first device-reset-required indicator to said indicator location, the first device-reset-required indicator indicating context data storage portions of the shared device which are accessed by the first accessor; and
    on switching context to a new context, after context save, when a second accessor requests use of said shared electronic device,
        writing a second device-reset-required indicator to the indicator location, the second device-reset-required indicator indicating context data storage portions of the shared device which are required by the second accessor;
        comparing the first and second device-reset-required indicators to determine context data storage portions which are not common for the first and second accessors; and
        resetting only the context data storage portions that are not common to the first and second accessors.

2. The machine-implemented method according to claim 1, wherein said making available said shared electronic device comprises making said device available through virtualization.

3. The machine-implemented method according to claim 1, wherein said establishing a portion of storage as an indicator location comprises creation of at least one of a flag register, a bitmap, a run-length encoding of a portion of storage, a scatter-gather table, and a mixed indicator data and executable code store.

4. The machine-implemented method according to claim 1, wherein said establishing a portion of storage as an indicator location comprises establishing a central location to serve a communicating network of said shared electronic devices.

5. The machine-implemented method according claim 1, wherein said establishing a portion of storage as an indicator location comprises establishing a plurality of device-level indicator locations.

6. The machine-implemented method according to claim 1, wherein said resetting context data comprises resetting to at least one of a clean boot state, a prior known state and a known trusted state.

7. The machine-implemented method according to claim 1, wherein said resetting context data comprises a direct memory access process.

8. An electronic control device operable to mutually isolate a plurality of accessors of a shared electronic device from leakage of context data after a context switch, at least one processor of the electronic control device being configured to perform operations comprising:
    when said shared electronic device is made available to said plurality of accessors, causing a storage component to perform at least one of: establishing a portion of storage as an indicator location for said shared electronic device and locating an address of a predefined indicator location;
    when a first said accessor requests use of said shared electronic device, writing a first device-reset-required indicator to said indicator location, the first device-reset-required indicator indicating context data storage portions of the shared device which are accessed by the first accessor;

responsive to said device-reset-required indicator and on switching context to a new context, after context save, when a second accessor requests use of said shared electronic device:
- writing a second device-reset-required indicator to the indicator location, the second device-reset-required indicator indicating context data storage portions of the shared device which are required by the second accessor;
- comparing the first and second device-reset-required indicators to determine context data storage portions which are not common for the first and second accessors; and
- resetting only the context data storage portions that are not common to the first and second accessors.

9. The electronic control device of claim 8, wherein said shared electronic device comprises at least one of a storage device, a cryptography engine, a wired communication device and a wireless communication device.

10. The electronic control device of claim 8, wherein the at least one processor is further configured to virtualize one or more said shared electronic device.

11. The electronic control device of claim 8, wherein at least one of said plurality of accessors comprises a microcontroller unit.

12. A non-transitory computer readable storage medium storing a computer program comprising computer program code to, when loaded into a computer system, cause said computer system to perform all the steps of the method of claim 1.

* * * * *